United States Patent
Narang et al.

(10) Patent No.: US 8,223,930 B2
(45) Date of Patent: Jul. 17, 2012

(54) METHOD AND SYSTEM FOR WORKGROUP VOICEMAIL MESSAGE

(75) Inventors: Nidhi Narang, Fremont, CA (US); Suneetha Tirumalai, Sunnyvale, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1326 days.

(21) Appl. No.: 11/904,650

(22) Filed: Sep. 27, 2007

(65) Prior Publication Data
US 2009/0086935 A1   Apr. 2, 2009

(51) Int. Cl.
  *H04M 1/64* (2006.01)
  *H04M 11/00* (2006.01)
  *H04M 1/725* (2006.01)
  *H04M 11/10* (2006.01)

(52) U.S. Cl. ............... 379/88.12; 379/88.16; 379/88.17; 379/88.18; 379/88.25; 379/70; 455/412.2; 455/413; 455/414.1; 455/415; 455/417

(58) Field of Classification Search ............... 455/414.1, 455/415, 458, 417, 564, 419, 567, 422, 412.2, 455/413; 379/201.01, 142.06, 265.02, 142, 379/88.14, 88.15, 88.25, 70, 88.12, 88.16–88.18
See application file for complete search history.

(56) References Cited

U.S. PATENT DOCUMENTS

| | | | |
|---|---|---|---|
| 5,224,150 A * | 6/1993 | Neustein ..................... 340/7.44 |
| 5,946,636 A * | 8/1999 | Uyeno et al. ................. 455/566 |
| 6,226,495 B1 * | 5/2001 | Neustein ..................... 340/311.2 |
| 6,442,250 B1 * | 8/2002 | Troen-Krasnow et al. 379/93.15 |
| 6,529,500 B1 * | 3/2003 | Pandharipande ............. 370/352 |
| 6,720,863 B2 * | 4/2004 | Hull et al. ..................... 340/7.51 |
| 6,804,334 B1 * | 10/2004 | Beasley et al. ............. 379/88.17 |
| 7,124,167 B1 * | 10/2006 | Bellotti et al. ................. 709/206 |
| 7,315,614 B2 * | 1/2008 | Bedingfield et al. ..... 379/142.07 |
| 7,315,738 B1 * | 1/2008 | Delker et al. ............... 455/414.1 |
| 7,826,827 B2 * | 11/2010 | Hull et al. .................. 455/412.2 |
| 7,844,247 B2 * | 11/2010 | Chen et al. .................. 455/404.1 |
| 2002/0064275 A1 * | 5/2002 | Tatsumi ......................... 379/229 |
| 2004/0248560 A1 * | 12/2004 | Bedingfield et al. ........ 455/412.2 |
| 2005/0069101 A1 * | 3/2005 | Bear et al. .................. 379/88.17 |
| 2006/0025164 A1 * | 2/2006 | Wang et al. ................... 455/466 |
| 2006/0165066 A1 * | 7/2006 | Campbell et al. ............. 370/352 |
| 2006/0172752 A1 * | 8/2006 | Harris et al. .................. 455/518 |
| 2007/0058658 A1 * | 3/2007 | Ruckart ......................... 370/444 |
| 2008/0018436 A1 * | 1/2008 | Traughber et al. ........ 340/286.07 |
| 2008/0021709 A1 * | 1/2008 | Greer ............................ 704/258 |
| 2008/0088437 A1 * | 4/2008 | Aninye et al. ............ 340/539.13 |
| 2008/0183814 A1 * | 7/2008 | Sanghavi ...................... 709/204 |
| 2008/0207177 A1 * | 8/2008 | Shukla .......................... 455/413 |
| 2009/0011780 A1 * | 1/2009 | Salinas et al. ................. 455/466 |
| 2009/0034696 A1 * | 2/2009 | Ramanathan .............. 379/88.17 |
| 2009/0077045 A1 * | 3/2009 | Kirchmeier et al. ............. 707/3 |
| 2009/0258633 A1 * | 10/2009 | Kim et al. .................. 455/412.2 |
| 2010/0146057 A1 * | 6/2010 | Abu-Hakima et al. ........ 709/206 |
| 2010/0235751 A1 * | 9/2010 | Stewart ......................... 715/736 |
| 2010/0273457 A1 * | 10/2010 | Freeman et al. ........... 455/412.2 |
| 2010/0290609 A1 * | 11/2010 | Clark et al. ............. 379/142.07 |
| 2011/0130122 A1 * | 6/2011 | Lee et al. ...................... 455/413 |

* cited by examiner

*Primary Examiner* — Lisa Hashem

(57) ABSTRACT

A method, system, and medium related to workgroup voicemail. The method may include receiving a workgroup voicemail for a call placed to a callable workgroup; providing a workgroup message waiting signal to a communication device associated with a member of the callable workgroup; and displaying a workgroup message waiting indication at the communication device associated with the callable workgroup member in response to the workgroup message waiting signal, the workgroup message waiting indication being distinct from a personal message waiting indication associated with the callable workgroup member.

20 Claims, 2 Drawing Sheets

METHOD AND SYSTEM FOR WORKGROUP VOICEMAIL MESSAGE

BACKGROUND

1. Field

Embodiments may generally relate to methods and systems for managing voice messaging. More particularly, some embodiments are concerned with providing an indication of a voicemail message associated with a workgroup.

2. Description

Telecommunication systems may allow for the grouping of multiple users into a "workgroup". A workgroup may refer to a group of people working together to achieve common business objectives. Workgroups may be formed along organizational divisions and subdivisions within an enterprise.

Conventional voice messaging systems allow a user to retrieve voice messages that are stored in a voice message mailbox specifically associated with the user. For example, a calling party may call a specific user's (i.e., a called party's) telephone number and, if the user does not answer the call within a specified number of rings, the call may be transferred to and answered by a voice message mailbox provider/system/service. The calling party may then leave (e.g., orally dictate) a voice message that is stored by the voice message mailbox provider/system/service in a voice message mailbox associated with the user. The specific called party may be provided with a notification that a voicemail message resulting from a call to the specific user is waiting for retrieval.

As such, there exist a need for a system, method, and computer executable program for managing workgroup voicemail messages, including a notification and indication of the workgroup message

SUMMARY

Some embodiments provide a system, method, device, program code and/or means to provide a notification of a workgroup message to a member of a callable workgroup. In some embodiments, a method may include receiving a workgroup voicemail for a call placed to a callable workgroup, providing a workgroup message waiting signal to a communication device associated with a member of the callable workgroup, and displaying a workgroup message waiting indication at the communication device associated with the callable workgroup member in response to the workgroup message waiting signal, where the workgroup message waiting indication is distinct from a personal message waiting indication associated with the callable workgroup member.

A system according to embodiments herein may include a voicemail management device to receive a workgroup voicemail for a call placed to a callable workgroup and to provide a workgroup message waiting signal, and a communication device associated with a member of the callable workgroup, where the communication device is to receive the workgroup message waiting signal and display a workgroup message waiting indication, in response to the workgroup message waiting signal wherein the workgroup message waiting indication is distinct from a personal message waiting indication associated with the callable workgroup member.

In some embodiments, a medium having machine executable program instructions stored thereon includes instructions to receive a workgroup voicemail for a call placed to a callable workgroup, instructions to provide a workgroup message waiting signal to a communication device associated with a member of the callable workgroup, and instructions to display a workgroup message waiting indication at the communication device associated with the callable workgroup member in response to the workgroup message waiting signal, the workgroup message waiting indication being distinct from a personal message waiting indication associated with the callable workgroup member.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
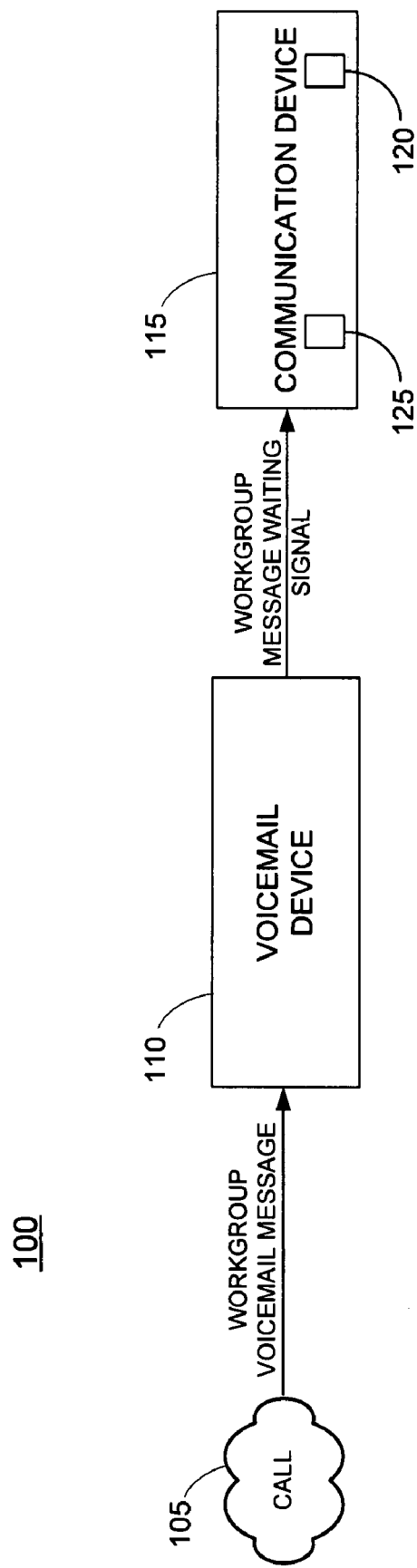
FIG. 1 is a representative block diagram of a system, according to some embodiments herein.

FIG. 1 is an illustrative block diagram of system 100 according to some embodiments herein. System 100 may include elements within a unified messaging system, system, or application according to some embodiments. In some other embodiments, system 100 may operate include elements of a dedicated messaging system, device, or application. System 100 includes voicemail device 110 and communication device 115. Voicemail device 110 and communication device 115 may be embodied by any suitable combinations of hardware, software and/or firmware, and may share one or more elements therebetween. In some embodiments, voicemail device 110 may include a voicemail server. Voicemail device 110 and communication device 115 may be co-located or remote from one another. Voicemail device 110 and communication device 115 may communicate over any suitable one or more protocols and/or physical communication links.

According to some embodiments, voicemail device 110 receives a call 105 from a calling party (not shown) to a callable workgroup. A workgroup, generally, refers to a plurality of users sharing a common contact and/or distribution rule across one or more media. The workgroup may be callable and share a common distribution rule across more than one media such as, for example, voice, email, text messaging, etc. In some embodiments, voice calls to a workgroup may be routed to members of the workgroup in a random or prioritized manner. Presence and context information for the workgroup may be based on collective presence and context information for the plurality of users (i.e., members) forming the workgroup.

Accordingly, call 105 placed to a callable workgroup may be routed to voicemail device 110 in the instance no member of the callable workgroup is available to or chooses not to accept the call. A determination of whether any member of the workgroup is available to take the call or in fact takes action to answer the call may be accomplished, in some embodiments, by a presence and availability (PA) system, application, module, methodology, and device. Voicemail device 110 may operate to provide the calling party with an option of leaving a voicemail message for the workgroup. For example, a purchaser of an electronic consumer product may call a customer service helpdesk regarding support for the product. The call placed to the helpdesk may be handled by a workgroup including a plurality of members. The workgroup may be connected to, in some instances, one or more of the members of the workgroup. Upon calling the helpdesk phone number and in the instance all members of the workgroup are busy with other customers or otherwise unable or unwilling to answer the call, the customer may be provided with the opportunity to leave a voicemail message for the workgroup.

A workgroup voicemail message provided by the customer may be received by voicemail device 110 for the purpose of, for example, informing the workgroup of the customer's concerns. Voicemail device 110 may generate a record of the workgroup voicemail message provided by the customer for further processing.

To inform the members of the callable workgroup that a workgroup voicemail associated with a call to the workgroup is available and awaiting a response or acknowledgement, voicemail device 110 may provide a workgroup voicemail signal to a communication device 115 associated with each one of the members of the workgroup. Communication device 115 may display a workgroup message waiting indication 120 in reply to receiving the workgroup voicemail signal. The displayed workgroup message waiting indication 120 provides a mechanism to notify the workgroup member associated with communication device 115 that a workgroup voicemail is awaiting disposition.

In accordance with some embodiments herein, workgroup message waiting indication 120 is distinguishable from a personal message waiting indication 125 that may also be provided to communication device 115. The personal message waiting indication 125 may be displayed as the result of a call to, but unanswered (i.e., completed) by, a specific called party. That is, a personal voicemail message results from a call placed to an individual call recipient as opposed to a workgroup message that results from a call placed to a workgroup comprised of one or more members.

In this manner, the workgroup member associated with communication device 115 may be readily and efficiently informed that a workgroup message, in contrast to a personal message, is awaiting retrieval, access, or other acknowledgement by the callable workgroup member.

It is noted that a plurality of members may belong to a callable workgroup and a corresponding plurality of communication devices may be provided such that each of the plurality of workgroup members may be associated with a communication device.

Figure 2:
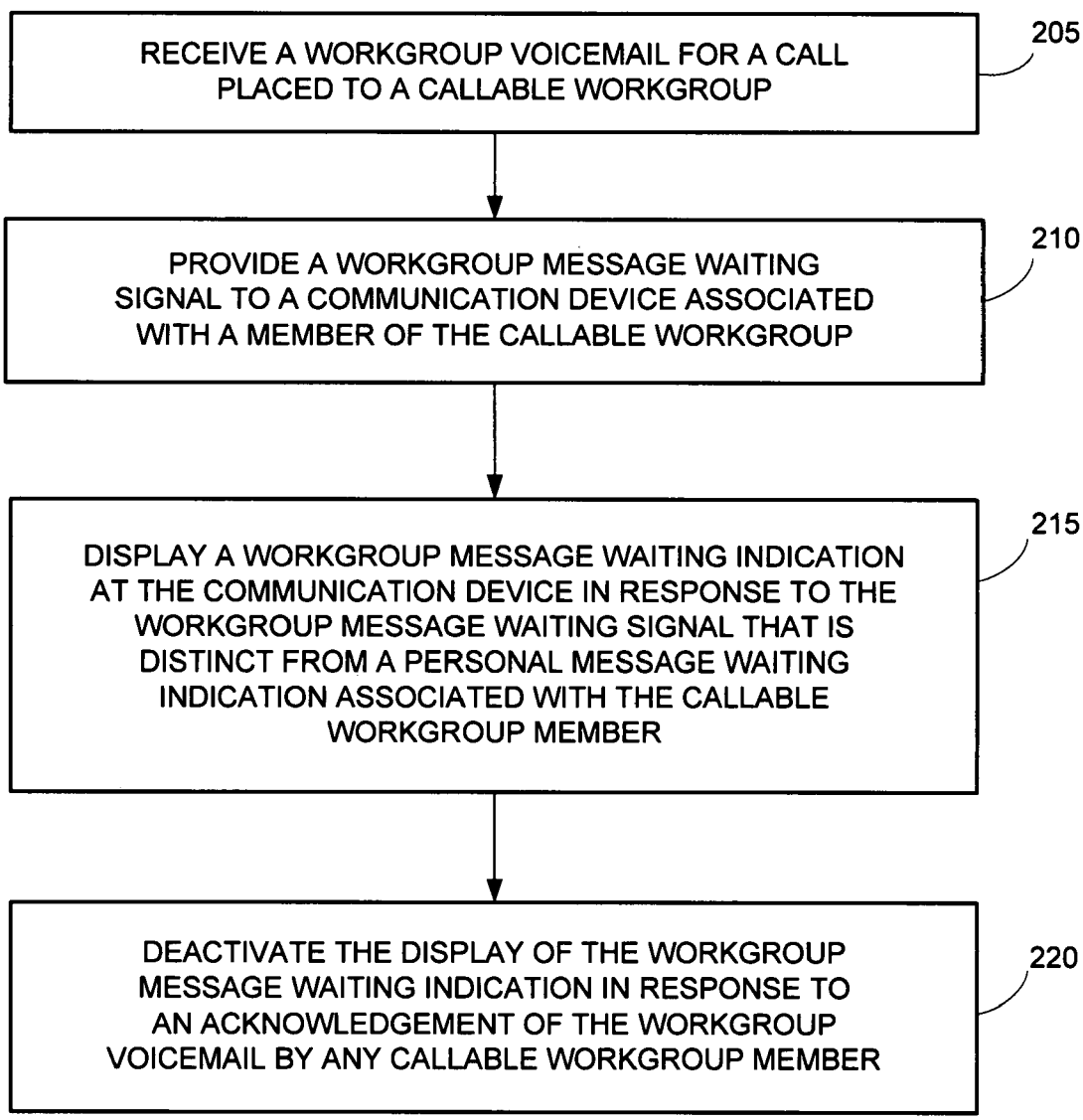
FIG. 2 is a flow diagram of a process, according to some embodiments.

FIG. 2 is a flow diagram of process 200 according to some embodiments. Process 200 may be executed by system 100 using any suitable hardware and/or software arrangement, and may be executed by any suitable device or devices that are or become known.

A call from a calling party to a callable workgroup is initially received at 205. According to some embodiments, the call may be received via a variety and combination of telecommunication networks and protocols such as, for example, a Public-Switched Telephone Network (PSTN), a Voice over Internet Protocol (VOIP) network, or a Global System for Mobile communication (GSM) network and/or may have been passed through one or more of these networks prior to receipt.

A voice message from the calling party to the called workgroup is acquired at 205. The voice message may be acquired using any suitable system that is or becomes known. Continuing with the foregoing example, execution of a voicemail application may cause voicemail device 110 to transmit an audible message (e.g., "Leave a Message at the Tone", followed by a tone) to the calling party via a circuit established at 205. Voicemail device 110 then records any audio signals received from the calling party via an audio circuit. Recording may terminate if the calling party terminates the call and/or if a pre-configured recording time limit is reached.

According to some embodiments of 205, voicemail device 110 executes a voicemail application to receive the call. In particular, voicemail device 110 determines that the call has not been answered by any member of the called workgroup and, in response, executes the voice mail application to perform any signaling required to establish a two-way audio circuit with the calling party in view of the appropriate call setup protocol.

At operation 210, the workgroup message waiting signal is provided to a communication device associated with a member of the callable workgroup. The workgroup message waiting signal may be provided to the communication device via one or more communication links, protocols, and telecommunication components. In some embodiments, the workgroup message waiting signal may be provided to all of the members of the workgroup while in some other embodiments the workgroup message waiting signal may be provided to a subset of the members of the workgroup. The subset of the members of the workgroup provided with the workgroup message waiting signal may be based on a random selection, a prioritized selection, or a rule based determination.

At operation 215, a workgroup message waiting indication is provided to the communication device 115 associated with a member of the callable workgroup. The workgroup message waiting indication may be provided to the communication device in response to the workgroup message waiting signal. Notably, the workgroup message waiting indication displayed is distinct and distinguishable from a personal message waiting indication indicative of a personal voicemail personally and specifically associated with the workgroup member (i.e., the personal voicemail is acquired in the process of a calling party calling a personal phone number associated with the member, not a workgroup number).

In some embodiments, the workgroup message waiting indication may be implemented as a visual indicator, an audible indicator, and a combination of the visual and audible indicators. The visual indicator may include, for example, an illuminated (non-illuminated) sensor, button, icon, soft key, and lamp; the presence of an icon or other indicia on a display (e.g., animated graphic); and the a particular sequencing of visual cues (e.g., fast or slow blinking lights in a particular color). The audible indicator may be implemented as one or more distinctive tones, beeps, buzzes, etc.

At operation 220, the display of the workgroup message waiting indication at communication device 115 is deactivated. In some embodiments, the deactivation of the display of the workgroup message waiting indication is invoked by a member of the called workgroup retrieving, accessing, and otherwise acknowledging (e.g., listening to, forwarding, erasing, etc.) the workgroup voicemail message. In some embodiments, any one of the plurality of the members of the called workgroup provided with the notification of the workgroup message waiting signal may retrieve, access, or otherwise acknowledge the workgroup voicemail message, thereby deactivating the displaying of the workgroup message waiting indication. In some embodiments, an acknowledgement of the workgroup message operates to deactivate the displayed workgroup message waiting indication at each of the communication devices associated with the members of the workgroup.

Recalling that the workgroup message waiting indication provided at the communication device(s) associated with the member(s) of the workgroup are distinct from the personal message waiting message indication provided at the communication device(s), process 200 provides an exemplary method and mechanism for providing a notification of and managing a workgroup voicemail message.

The above-mentioned signals, calls, and voicemail messages may pass through any number of networks, devices and protocols before reaching their intended workgroup member.

In some embodiments, the methods and systems disclosed herein may be implemented by a combination of hardware and software components. In some aspects, the methods and systems may be accomplished, at least in part, using computing processors to execute computer code and program instructions stored on a memory (e.g., flash memory, RAM, ROM, disk drive, and other media) or otherwise accessible by the processor.

Embodiments described above are not intended to be limited to the specific form set forth herein, but are intended to cover such alternatives, modifications and equivalents as can reasonably be included within the spirit and scope of the appended claims.

What is claimed is:

1. A method comprising:
   receiving a workgroup voicemail for a call placed to a callable workgroup, the callable workgroup comprising a plurality of communication devices associated with users sharing at least one of a common contact and a distribution rule across at least one media;
   providing a workgroup message waiting signal to the communication devices of the callable workgroup; and
   displaying a workgroup message waiting indication at each of the communication devices in response to the workgroup message waiting signal, the workgroup message waiting indication being separate and distinct from a personal message waiting indication displayable by each of the communication devices that is associated with a respective user of the callable workgroup.

2. The method of claim 1, wherein the workgroup message waiting indication resulting from the call placed to the callable workgroup is received at each of the plurality of communication devices and wherein the personal message waiting indication resulting from a call placed to one of the plurality of communication devices of the callable workgroup and is received only at that communication device.

3. The method of claim 1, further comprising:
   determining whether a member of the callable workgroup is available to receive the call placed to the callable workgroup using a Presence and Availability system.

4. The method of claim 1, wherein the workgroup message waiting indication is automatically displayed at each of the communication devices in response to the workgroup message waiting signal.

5. The method of claim 1, wherein receiving the workgroup voicemail for the call placed to the callable workgroup comprises a voicemail device receiving the workgroup voicemail and wherein displaying the workgroup message waiting indication at each of the communication devices in response to the workgroup message waiting signal comprises displaying the workgroup message waiting indication in response to the workgroup message waiting signal sent from the voicemail device.

6. The method of claim 1, wherein providing the workgroup message waiting signal to the communication devices of the callable workgroup comprises providing the workgroup message waiting signal to a subset of the plurality of communication devices of the callable workgroup based on at least one of a random selection, a prioritized selection, and a rule based determination.

7. The method of claim 1, wherein displaying the workgroup message waiting indication at each of the communication devices comprises each of the communication devices using at least one of a sensor, button, icon, soft key, and lamp.

8. The method of claim 1 further comprising:
   accessing the workgroup voicemail by one of the communication devices; and
   deactivating the displaying of workgroup message waiting indication at the plurality of communication devices of the callable workgroup in response to the accessing of the workgroup voicemail by a member of the callable workgroup.

9. A system for providing voicemails to a callable workgroup, the callable workgroup comprising a plurality of communication devices associated with users sharing at least one of a common contact and a distribution rule across at least one media, the system comprising:
   a voicemail management device to receive a workgroup voicemail for a call placed to the callable workgroup and to provide a workgroup message waiting signal to the communication devices of the callable workgroup; and
   each of the communication devices receive the workgroup message waiting signal and display a workgroup message waiting indication in response to the workgroup message waiting signal that is distinct from a personal message waiting indication associated with the user of that communication device.

10. The system of claim 9, wherein the workgroup message waiting indication resulting from the call placed to the callable workgroup and is received at each of the plurality of communication devices and wherein the personal message waiting indication resulting from a call placed to one of the plurality of communication devices of the callable workgroup and is received only at that communication device.

11. The system of claim 9, wherein the workgroup message waiting indication is automatically displayed at each of the communication devices in response to the workgroup message waiting signal and is automatically deactivated at each of the communication devices of the callable workgroup in response to a member of the callable workgroup accessing the workgroup voicemail.

12. The system of claim 9, wherein the voicemail management device determines whether a member of the callable workgroup is available to receive the call placed to the callable workgroup using a Presence and Availability system.

13. The system of claim 9, wherein the voicemail management device provides the workgroup message waiting signal to a subset of the plurality of communication devices of the callable workgroup based on at least one of a random selection, a prioritized selection, and a rule based determination.

14. A non-transitory medium having machine readable program instructions stored thereon, the non-transitory medium comprising:
   instructions to receive a workgroup voicemail for a call placed to a callable workgroup, the callable workgroup comprising a plurality of communication devices associated with users sharing at least one of a common contact and a distribution rule across at least one media;
   instructions to provide a workgroup message waiting signal to the communication devices; and
   instructions to cause the communication devices to display a workgroup message waiting indication in response to the workgroup message waiting signal, the workgroup message waiting indication for each of the communication devices being distinct from a personal message waiting indication associated with the user associated with that communication device.

15. The medium of claim 14, further comprising instructions to determine whether a member of the callable workgroup is available to receive the call placed to the callable workgroup using a Presence and Availability system.

16. The medium of claim 15, wherein the Presence and Availability system receives presence and context information for the workgroup based on collective presence and context information of the plurality of users of the workgroup.

17. The medium of claim 14, wherein the workgroup message waiting indication resulting from the call placed to the callable workgroup and is received at each of the plurality of communication devices and wherein the personal message waiting indication resulting from a call placed to one of the plurality of communication devices of the callable workgroup and is received only at that communication device.

18. The medium of claim 14, wherein the workgroup message waiting indication is automatically displayed at the communication devices in response to the workgroup message waiting signal and is automatically deactivated at each of the communication devices of the callable workgroup in response to a member of the callable workgroup accessing the workgroup voicemail.

19. The medium of claim 14, wherein the workgroup message waiting indication is displayed at each of the communication devices using at least one of a sensor, button, icon, soft key, and lamp.

20. The medium of claim 14, wherein the instructions to provide the workgroup message waiting signal provide the workgroup message waiting signal to a subset of the plurality of communication devices of the callable workgroup based on at least one of a random selection, a prioritized selection, and a rule based determination.

* * * * *